(12) United States Patent
Cook et al.

(10) Patent No.: US 9,417,094 B2
(45) Date of Patent: Aug. 16, 2016

(54) DISPLACEMENT SENSOR FOR FORCE INDICATING CALIPER

(71) Applicant: Mitutoyo Corporation, Kanagawa-ken (JP)

(72) Inventors: Ted Staton Cook, Kirkland, WA (US); Bjorn E. B. Jansson, Snohomish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 191 days.

(21) Appl. No.: 14/194,320

(22) Filed: Feb. 28, 2014

(65) Prior Publication Data

US 2015/0247742 A1    Sep. 3, 2015

(51) Int. Cl.
| | | |
|---|---|---|
| *G01B 3/20* | (2006.01) | |
| *G01D 5/12* | (2006.01) | |
| *G01B 5/00* | (2006.01) | |

(52) U.S. Cl.
CPC ........ *G01D 5/12* (2013.01); *G01B 3/205* (2013.01); *G01B 5/00* (2013.01)

(58) Field of Classification Search
CPC ............ G01B 3/20; G01B 3/205; G01B 5/00; G01B 5/02; G01D 5/12; G01D 5/20; G01D 5/2006; G01D 5/2013; G01D 5/202
USPC ................. 33/706, 784; 324/207.17, 207.24
See application file for complete search history.

(56) References Cited

U.S. PATENT DOCUMENTS

| | | | |
|---|---|---|---|
| 517,208 A | | 3/1894 | Billings |
| 2,741,848 A | | 4/1956 | Livingston |
| 2,952,916 A | | 9/1960 | Germann |
| 3,113,384 A | * | 12/1963 | Keszler .................... G01B 3/20 33/811 |

(Continued)

FOREIGN PATENT DOCUMENTS

| | | | |
|---|---|---|---|
| GB | 1135553 A | 12/1968 | |
| JP | 09049720 A | * 2/1997 | ............... G01B 3/20 |
| WO | 86/01285 A1 | 2/1986 | |

OTHER PUBLICATIONS

U.S. Appl. No. 13/706,225, filed Dec. 5, 2012, entitled "System and Method for Setting Measurement Force Thresholds in a Force Sensing Caliper," 36 pages.

(Continued)

*Primary Examiner* — R. A. Smith
(74) *Attorney, Agent, or Firm* — Seed IP Law Group PLLC

(57) ABSTRACT

A caliper including a scale member, a slider, a slider displacement sensor and a force sensing arrangement. The force sensing arrangement is configured to provide a signal indicative of a measurement force, and includes elements fabricated on the same circuit board as the slider displacement sensor. In one implementation, the force sensing arrangement includes drive and sense coils that are fabricated in one or more metal layers of the circuit board. A signal modulating element (e.g., a metal core) is also included which is attached to a force actuator which moves in accordance with the amount of measurement force that is being applied. The force actuator moves relative to the linearly displaced coils and the attached signal modulating element affects the inductive coupling between the coils. The resulting signals from the coils may be utilized to determine the position of the signal modulating element and the corresponding measurement force.

19 Claims, 6 Drawing Sheets

(56) References Cited

U.S. PATENT DOCUMENTS

| | | | |
|---|---|---|---|
| 3,742,609 A | 7/1973 | Jeannet et al. | |
| 4,873,771 A * | 10/1989 | Wust | G01B 3/20 33/802 |
| 5,029,402 A | 7/1991 | Lazecki et al. | |
| 5,574,381 A | 11/1996 | Andermo et al. | |
| 5,886,519 A | 3/1999 | Masreliez et al. | |
| 5,901,458 A | 5/1999 | Andermo et al. | |
| 5,973,494 A | 10/1999 | Masreliez et al. | |
| RE37,490 E | 1/2002 | Andermo et al. | |
| 6,400,138 B1 | 6/2002 | Andermo | |
| 6,522,129 B2 * | 2/2003 | Miyata | G01D 5/2053 324/207.16 |
| 7,246,032 B2 | 7/2007 | Feldman | |
| 7,443,159 B2 * | 10/2008 | Habenschaden | G01D 5/2013 324/207.15 |
| 7,530,177 B1 | 5/2009 | Meichle et al. | |
| 7,533,474 B2 | 5/2009 | Saito et al. | |
| 8,205,510 B2 | 6/2012 | DiLuigi | |
| 8,357,120 B2 | 1/2013 | Moller et al. | |
| 8,898,923 B2 * | 12/2014 | Nahum | G01L 1/00 33/810 |
| 2003/0047009 A1 | 3/2003 | Webb | |
| 2011/0137967 A1 | 6/2011 | Jansson | |
| 2014/0150570 A1 * | 6/2014 | Nahum | G01L 1/00 73/862.541 |
| 2015/0247717 A1 * | 9/2015 | Emtman | G01B 3/205 74/89 |
| 2015/0276366 A1 * | 10/2015 | Emtman | G01B 3/205 33/701 |

OTHER PUBLICATIONS

U.S. Appl. No. 14/194,461, filed Feb. 28, 2014, entitled "Wheel Assembly for Moving Caliper Jaw With Repeatable Force," 47 pages.

U.S. Appl. No. 14/231,492, filed Mar. 31, 2014, entitled "Flexible Mount for Coupling Force Actuator to Caliper Jaw," 41 pages.

U.S. Appl. No. 14/267,666, filed May 1, 2014, entitled "Caliper Force Indicator With Tactile or Auditory Feedback," 69 pages.

U.S. Appl. No. 14/644,079, filed Mar. 10, 2015, entitled "Compliant Thumb Wheel Assembly Coupled to a Caliper Jaw," 55 pages.

\* cited by examiner

DISPLACEMENT SENSOR FOR FORCE INDICATING CALIPER

BACKGROUND

1. Technical Field

The invention relates generally to precision measurement instruments, and particularly to calipers with a movable jaw for measuring the dimensions of an object.

2. Description of the Related Art

Various electronic calipers are known that use electronic position encoders. These encoders are generally based on low-power inductive, capacitive, or magnetic position sensing technology. In general, an encoder may comprise a read head and a scale. The read head may generally comprise a read head sensor and read head electronics. The read head outputs signals that vary as a function of the position of the read head sensor relative to the scale, along a measuring axis. In an electronic caliper the scale is generally affixed to an elongated scale member that includes a first measuring jaw and the read head is affixed to a slider which is movable along the scale member and which includes a second measuring jaw. Thus, measurements of the distance between the two measuring jaws may be determined based on the signals from the read head.

Exemplary electronic calipers are disclosed in commonly assigned U.S. Pat. Nos. RE37490, 5,574,381, and 5,973,494, each of which is hereby incorporated herein by reference in its entirety. A prior art electronic caliper that is capable of measuring force is disclosed in U.S. Patent Publication No. 2003/0047009 (the "'009 publication"). As described in the '009 publication, one deficiency in the use of prior calipers is the variation in force which can be applied by the measuring jaws and the differences in measurement which can occur as a result. Particularly when a soft object is being measured, the measurement of the object may be unreliable or non-repeatable because one may apply either a higher force on the jaws of the caliper such that the soft object is "more compressed", or apply a lower force such that the soft object is "less compressed". As a solution, the '009 publication discloses a caliper that is capable of measuring both the size and force applied to an object, which may be analyzed to provide more repeatable measurements. The force is measured with a strain gauge sensor that is attached with a bracket to a read head. The strain gauge sensor outputs a signal related to the amount of force applied to an object that is being measured by the caliper, and the signal is transmitted to a printed circuit board. While the '009 publication does disclose taking force measurements, the configuration that it utilizes for doing so requires the use and attachment of the strain gauge sensor. In addition, the signal must somehow be transmitted to the printed circuit board, requiring that additional wiring or other coupling techniques be utilized. Furthermore, specialized processing may be required for converting the signal from the strain gauge sensor to a useful force reading for use with the caliper. A need exists for a more economical configuration that indicates a level of force in a caliper while minimizing the need for external electronic components and attachments to a printed circuit board, and which operates reliably in a typical environment for caliper use.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electrically powered caliper is provided, including a scale member, a slider, a slider displacement sensor and a force sensing arrangement. The scale member includes a first measuring surface to be located against a workpiece during a measurement. The slider includes a second measuring surface to be located against a workpiece during a measurement. The slider displacement sensor is configured to provide a position signal responsive to changes in a position of the slider along the scale member, and includes a conductive signal sensing element fabricated on a circuit board carried on the slider.

The measurement force sensing arrangement is also located on the slider and includes a force actuator, a force element displacement sensor, and a force sensing circuit. The force actuator moves relative to the circuit board. The force element displacement sensor includes at least one conductive signal sensing element and at least one signal modulating element. The at least one conductive signal sensing element is fixed relative to the circuit board. The at least one signal modulating element is coupled to the force actuator and is located proximate to the at least one conductive signal sensing element. The force sensing circuit is located on the circuit board and is coupled to the at least one conductive signal sensing element. The measurement force sensing arrangement is configured to provide a force signal responsive to changes in a measurement force exerted on a workpiece by a user through at least one of the first and second measuring surfaces during a measurement procedure.

In various implementations, the force actuator may comprise a rigid element coupled to a force spring rate spring having a dimension that is altered by a user through the force actuator to vary the measurement force. The at least one signal modulating element may be coupled to the force actuator, and may be configured to move corresponding to the altered dimension and proximate to the at least one conductive signal sensing element. The at least one conductive signal sensing element may be fabricated in a metal layer of the circuit board carried on the slider. The force sensing circuit may be responsive to the position of the at least one signal modulating element relative to the at least one conductive signal sensing element.

In various implementations, the at least one conductive signal sensing element may comprise a variable inductance element having an inductance that depends on the position of the at least one signal modulating element. The force element displacement sensor may further comprise at least one inductive drive element which is inductively coupled to the at least one variable inductance element, wherein the inductive coupling depends on the position of the at least one signal modulating element. The at least one signal modulating element may comprise at least one of a non-ferrous conductor or a ferrite material.

In various implementations, the at least one variable inductance element may comprise at least two planar coils fabricated in a metal layer of the circuit board carried on the slider. In one implementation, the at least two planar coils may be symmetric with respect to one another, and the signal modulating element may cover approximately half of each of the at least two planar coils when in a rest position.

In various implementations, the at least one variable inductance element may comprise a planar signal coil and the inductive drive element may comprise a planar drive coil that is fabricated in a metal layer of the circuit board carried on the slider. The planar signal coil and the planar drive coil may be configured to surround a shared area. In one implementation, the circuit board may comprise two layers, wherein the planar signal coil and the planar drive coil may be fabricated in the same metal layer of the circuit board. In another implementation, the circuit board may comprise four layers, and the planar signal coil and the planar drive coil may be fabricated in different metal layers of the circuit board.

In various implementations, the slider displacement sensor may receive a position drive signal from a driving circuit, and the driving circuit may also provide a force drive signal to the force element displacement sensor. In one implementation, the position drive signal and the force drive signal may be provided during different clock cycles for the driving circuit.

In various implementations, the circuit board carried on the slider may abut the slider at a mounting region of the circuit board. In addition, the conductive signal sensing element of the slider displacement sensor may overlap the scale member in a scale region located in a first lateral direction away from the mounting region. Furthermore, the at least one conductive signal sensing element of the force element displacement sensor may be arranged in a region located in the opposite lateral direction away from the mounting region. It will be appreciated that in this configuration, the metal slider may, in addition to its usual slider functions, also act to shield the signals for the two displacement sensors from one another.

DETAILED DESCRIPTION

Figure 1:
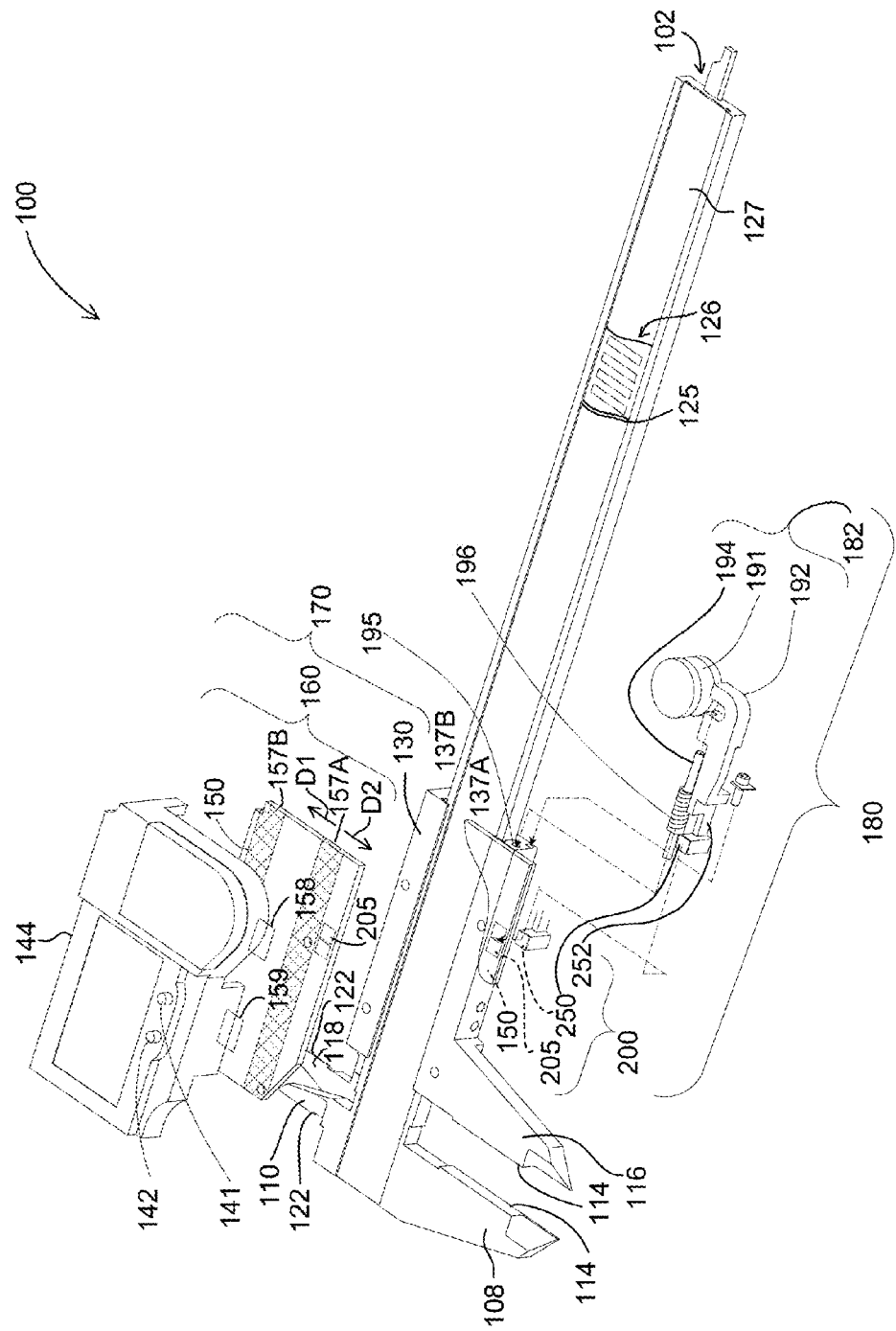
FIG. 1 is an exploded view diagram of a hand tool type caliper including a scale and slider with a signal modulating element of a force element displacement sensor attached to a first embodiment of a force actuator assembly.

FIG. 1 is an exploded view diagram of a hand tool type caliper 100 with a signal modulating element 250 attached to a first embodiment of a force actuator assembly 182. In this example, the caliper 100 comprises a slider displacement sensor 158 (e.g., a magnetic or inductive sensor assembly) and a scale substrate 125 including a scale track 126 (a cutaway segment of each is illustrated) positioned in a groove 127 along an elongated scale member 102. It will be appreciated that in other embodiments other types of slider displacement sensors 158 may be utilized (e.g., capacitive, etc.) A slider assembly 170 includes an electronic assembly 160 attached to a slider 130. The slider displacement sensor 158 is included in the electronic assembly 160. The general mechanical structure and physical operation of the caliper 100 is similar to that of certain prior electronic calipers, such as that of commonly assigned U.S. Pat. No. 5,901,458, which is hereby incorporated herein by reference in its entirety. The scale member 102 is a rigid or semi-rigid bar which may include various grooves and/or other features incorporated into a generally rectangular cross section. The scale substrate 125 may be rigidly bonded in the groove 127, and the scale track 126 may include scale elements that cooperate with corresponding elements (not shown) of the slider displacement sensor 158 included in the electronic assembly 160, in a manner similar to that used in known electronic calipers and as described in the previously incorporated U.S. Pat. Nos. RE37490 and 5,901,458, and in commonly assigned U.S. Pat. No. 6,400,138, which is incorporated herein by reference in its entirety.

A pair of jaws 108 and 110 are integrally formed near a first end of the scale member 102. A corresponding pair of jaws 116 and 118 are formed on the slider 130. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes referenced as the zero position, the engagement surfaces 114 abut one another, the engagement surfaces 122 are aligned, and both the outside and inside dimensions measured by the caliper 100 may be indicated as zero.

The measured dimension may be displayed on a digital display 144, which is mounted within a cover 140 of the electronic assembly 160 of the caliper 100. The electronic assembly 160 may also include a push button switch 141 (e.g., an "origin" switch), a force status indicator 142 (e.g., a two or three color light), and a signal processing and display circuit board 150. Force threshold setting operations are described in more detail in co-pending and commonly assigned U.S. patent application Ser. No. 13/706,225 (hereinafter the "'225 application"), titled "System and Method for Setting Measurement Force Thresholds in a Force Sensing Caliper", filed Dec. 5, 2012, which is hereby incorporated by reference in its entirety. As described in the '225 application, the push button switch 141 may in one implementation be utilized as part of a process for setting force thresholds, and the force status indicator 142 may be utilized for providing force threshold signals (e.g., "green" when the force is within a desired measuring range, and "red" when the force has exceeded the desired measuring range.)

The signal processing and display circuit board 150 may comprise a read head signal processing and control circuit 159. As shown in FIG. 1, the bottom surface of the signal processing and display circuit board 150 may be mounted to abut the top surfaces of the slider 130 on either side of the scale member 102.

A force measuring arrangement 180 includes various components that are mounted to the slider 130. As will be described in more detail below, the force measuring arrangement 180 includes a force sensing arrangement, which in this particular embodiment is provided by a first embodiment of a force actuator assembly 182 and a force element displacement sensor 200. The force element displacement sensor 200 includes an arrangement of displacement signal elements 205, a signal modulating element 250 and a force actuator element 252. As will be described in more detail below with respect to FIG. 6, the arrangement of displacement signal elements 205 is fabricated in one or more metal layers of the circuit board 150 and produces electrical signals that are indicative of the position of the signal modulating element 250. The read head signal processing and control circuit 159 includes a force sensing circuit which receives the force sensing signals from the arrangement of displacement signal elements 205 for determining force measurements. The read head signal processing and control circuit 159 may also provide driving signals to the arrangement of displacement signal elements 205, as will further be described in more detail below with respect to FIG. 6.

In one embodiment, the signal modulating element 250 comprises a desired material attached to the force actuator element 252 which is mechanically coupled to, or part of, the force actuator assembly 182. In another embodiment, the signal modulating element 250 may comprise the same material as the force actuator element 252 and/or may comprise a portion of it. The force actuator assembly 182 includes a thumb wheel 191, a force actuator body 192, a guide rod/bearing 194, and an actuator force spring rate spring 196. As a user pushes on the thumb wheel 191 so as to move the slider 130 toward the first end of the scale member 102, the force actuator element 252 and attached signal modulating element 250 are pushed forward so as to move in a guided fashion along the caliper measuring axis direction relative to the arrangement of displacement signal elements 205. The signal modulating element 250 is arranged with a relatively small gap proximate to the displacement signal elements 205 such that they sense its relative position along the measuring axis direction, as will be described in more detail below with respect to FIG. 6. It will be appreciated that the position of the signal modulating element 250 corresponds to the compression or extension of the actuator force spring rate spring 196, and is therefore indicative of the corresponding measuring force.

In various implementations, the circuit board 150 may abut the slider 130 at one or more mounting regions of the circuit board 150. More specifically, as shown in FIG. 1, the circuit board 150 has mounting regions 157A and 157B which abut corresponding mounting regions 137A and 137B on the slider 130. In addition, a conductive signal sensing element (not shown) of the slider displacement sensor 158 may overlap the scale member 102 in a scale track 126 located in a first lateral direction D1 away from the mounting region 157A. Furthermore, at least one conductive signal sensing element (as will be described in more detail below with respect to FIGS. 4A, 4B and 5A-5D) of the arrangement of displacement signal elements 205 of the force element displacement sensor 200 may be arranged in a region located in an opposite lateral direction D2 away from the mounting region 157A. It will be appreciated that in this configuration, the metal slider 130 may, in addition to its usual slider functions, also act to shield simultaneous signals for the slider displacement sensor 158 and the force element displacement sensor 200 from one another.

In various implementations, the actuator force spring rate spring 196 may be a single spring, or may consist of separate spring rate spring portions 196A and 196B, as will be described in more detail below with respect to FIG. 2. As shown in FIG. 1, the actuator force spring rate spring 196 is located around the guide rod/bearing 194, which is received within a guide rod/bearing hole 195 of the slider 130. As a user pushes on the thumb wheel 191 so as to move the slider 130 toward the first end of the scale member 102, the actuator force spring rate spring 196 (or the spring rate spring portion 196A of FIG. 2) is compressed. As will be described in more detail below, the utilization of the actuator force spring rate spring 196 (or spring portions 196A and 196B) allows a gradual increase or decrease in force to occur over a range of positions. Importantly, this results in more control and a better "feel" for a user when attempting to exert control to provide a desired amount of force during a measuring process.

Figure 2:
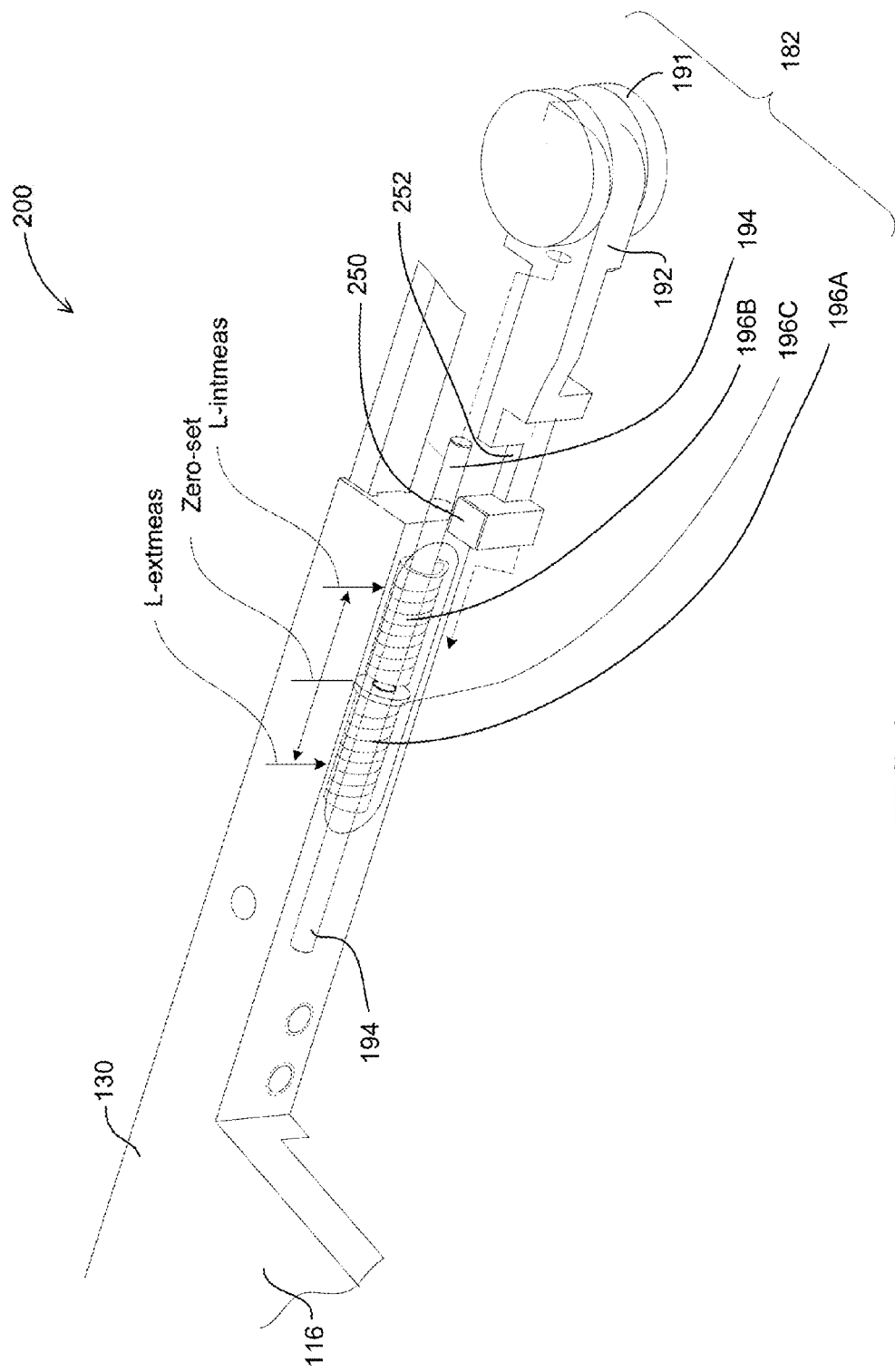
FIG. 2 is an exploded view diagram of the force actuator assembly of FIG. 1 with the signal modulating element attached.

FIG. 2 is an exploded view diagram of the force actuator assembly 182 of FIG. 1. As illustrated in FIG. 2, in one implementation the guide rod/bearing 194 may be tethered between two spring portions 196A and 196B of the actuator force spring rate spring 196, which may also be two separate springs in some embodiments. The two actuator force spring rate spring portions 196A and 196B are located around the guide rod/bearing 194, and abut a divider 196C (e.g., a C-clip ring) which is fixed to the guide rod/bearing 194. In this configuration, when a user pushes on the thumb wheel 191 so as to move the slider 130 toward the first end of the scale member 102, the actuator force spring rate spring portion 196A is compressed (e.g., for the measurement of the outside dimensions of a workpiece), similar to the operation for the actuator force spring rate spring 196 of FIG. 1. However, when a user moves the thumb wheel 191 in the opposite direction (i.e., so as to reverse the direction of the slider 130 toward the opposite end of the scale member 102), the actuator spring rate spring portion 196B is compressed (e.g., for the measurement of the inside dimensions of a workpiece.) In this manner, a bi-directional measurement configuration is achieved through the utilization of the spring rate spring portions 196A and 196B.

In one example configuration, the general operation of the caliper 100 may be described as follows. The caliper may begin at a position zero-set. At the position zero-set, the caliper is generally in the middle of the bi-directional measurement range, where the actuator force spring rate spring portions 196A and 196B are each biased approximately equally, and the signal modulating element 250 is approximately in the middle of the range of the arrangement of displacement signal elements 205 (i.e., as will be described in more detail below with respect to FIG. 6). As the user pushes the thumb wheel 191 so as to compress the spring rate spring portion 196A, a limit position L-extmeas may be reached. The limit position L-may correspond to an external measurement force limit (e.g., for measuring the external dimensions of a workpiece). For example, the compressed spring portion 196A may reach its solid height and prevent further deflection of the signal modulating element 250 with increasing applied force, preventing meaningful force measurement. This may also or alternatively correspond to the signal modulating element 250 reaching a first end of the sensing range of the displacement signal elements 205.

Similarly, when the thumb wheel 191 is moved by a user in the opposite direction, a limit position I-intmeas may be reached. The limit position I-intmeas may correspond to an internal measurement limit (e.g., for measuring the internal dimensions of a workpiece.) This may also or alternatively correspond to the signal modulating element 250 reaching a second end of the sensing range of the displacement signal elements 205. The ends of the sensing range of the arrangement of displacement signal elements 205 may be defined by the limits of a region where the resulting sense signals have desired linearity or according to other criteria. The undesirable range for the spring portions 196A and 196B may be defined by the springs either being relatively insensitive to force because they have approximately reached their solid height, or reaching a point where the sense signals are becoming unacceptably non-linear, or the like.

In one specific example implementation, when the position of the signal modulating element 250 is sensed by the arrangement of displacement signal elements 205 as having reached a location corresponding to the limit positions L-extmeas or I-intmeas, the read head signal processing and control circuit 159 may activate the "red" or "out of range" force status indicator (light) 142. During normal operation, the read head signal processing and control circuit 159 may be configured to generally sense the position of the signal modulating element 250 and convert the position to force measurements. The resulting force measurements may in various implementations be presented to a user in a variety of formats (e.g., as force readings on the display, as various other types of indictors when force limits are reached, etc.)

As described in more detail in the incorporated '225 application, it will be appreciated that while the bi-directional measurement configuration of FIG. 2 is illustrated as being achieved with the two actuator force spring rate spring portions 196A and 196B, other configurations may also be implemented. For example, in an alternative embodiment, a single actuator force spring rate spring may be utilized that is permanently attached at both ends. Such a configuration would allow the necessary forces to be achieved by pulling or pushing on the same spring. In one specific example illustration, where the measurement is of the outer dimensions of the workpiece, such a spring could be compressed 2-4 mm, with a force in the range 3 to 5N. For the measurements of the internal dimensions of a workpiece the spring could be stretched 2-4 mm with a force in the range of 3 to 5N. In general, with regard to such embodiments and/or the embodiment of FIG. 2, in certain specific implementations it has been experimentally determined that it may be desirable to use springs that have a rating of 0.25 N/mm to 6 N/mm, in order to provide certain ergonomic characteristics. It should be appreciated that while applying a controlled force when using a caliper, generally some fingers of a hand grip the caliper scale (thus fixing most of the hand relative to the caliper), a finger may also wrap around the slider, and a thumb may move relative to the hand to adjust the force actuator relative to the slider. Thus, the convenient amount of thumb travel is limited, relative to the remainder of the hand. In general, the 0.25 N/mm limit ensures that a useful amount of force variation may be provided within a convenient and comfortable amount of thumb travel relative to the remainder of the hand, while the upper limit of 6 N/mm ensures that the force variation with a small motion of the thumb is not so great that the user finds it too sensitive for easy and stable control, even for workpieces which may deflect and/or creep under a measurement force. In other words, it has been experimentally determined that this spring rate range provides a user with a desirable measurement feel. In various embodiments, the signal modulating element 250 and the arrangement of displacement signal elements 205 may be sized accordingly. It will be appreciated that through the use of levers or gears or other known machine elements, the relationship between finger displacement and force may be changed such that other springs rates (e.g., in the range of 0.05 to 20 N/mm) may be used in other embodiments. In some embodiments, other spring types (e.g., a resilient polymer material) may be used to provide the force spring rate spring.

Figure 3:
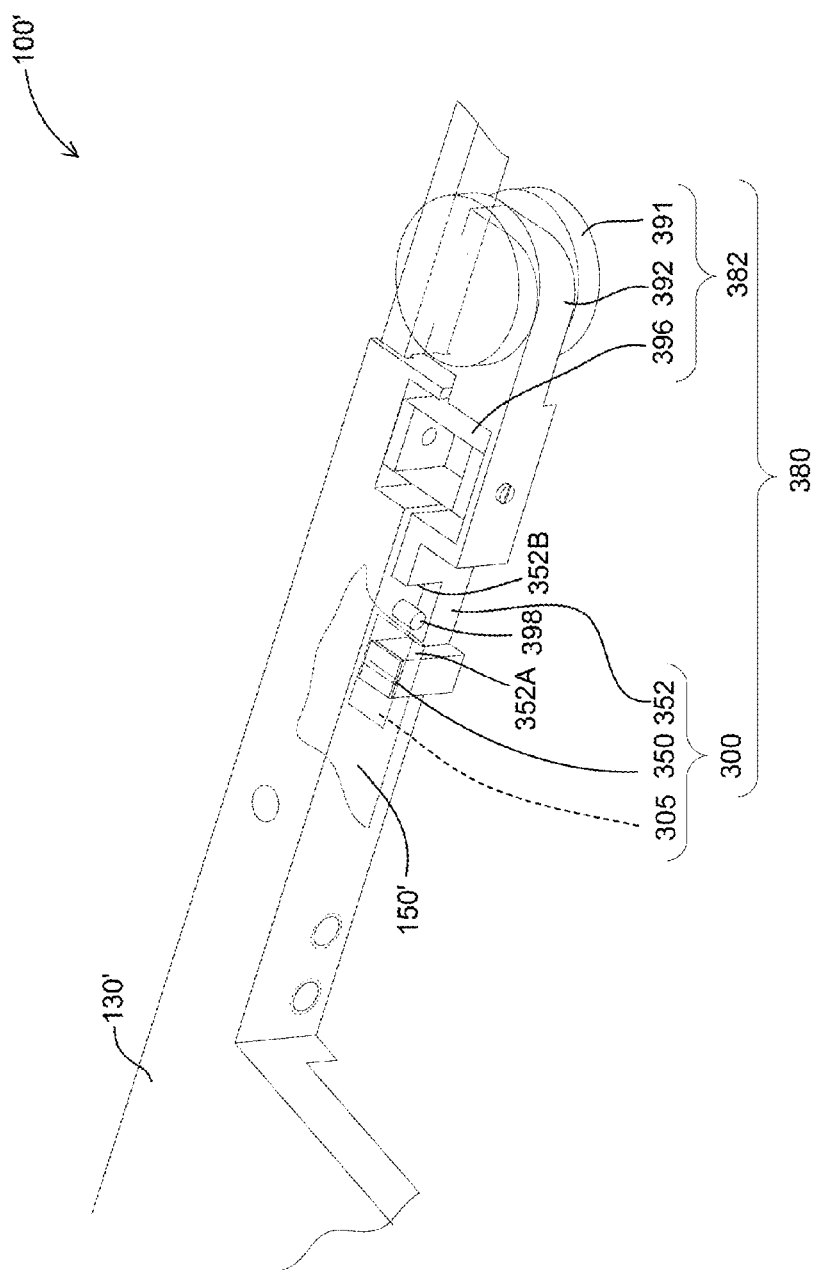
FIG. 3 is an isometric view diagram of a second embodiment of a force actuator assembly with a signal modulating element attached.

FIG. 3 is an exploded view diagram of a second embodiment of a force actuator assembly 382 with a signal modulating element 350 of a force element displacement sensor 300 attached. It will be appreciated that various components of the force actuator assembly 382, force element displacement sensor 300 and an associated caliper 100' may be similar to similarly numbered components of the force actuator assembly 182, force element displacement sensor 200 and associated caliper 100 of FIGS. 1 and 2, and will be understood to function in a similar manner except as otherwise described below. As shown in FIG. 3, a force measuring assembly 380 may include the force element displacement sensor 300 and the force actuator assembly 382. Various components of the force measuring assembly 380 are shown to be mounted to a slider 130' of the caliper 100'.

The force element displacement sensor 300 includes an arrangement of displacement signal elements 305, a signal modulating element 350, a force actuator element 352, and a travel limit pin 398. The force actuator element 352 includes internal surfaces 352A and 352B that may contact the travel limit pin 398 to establish the limits of the movement of the force actuator element 352. As will be described in more detail below with respect to FIG. 6, the arrangement of displacement signal elements 305 is fabricated in one or more metal layers of a circuit board 150' that is carried on the slider 130' and produces electrical signals that are indicative of the position of the signal modulating element 350. A force sensing circuit (e.g., as part of the read head signal processing and control circuit 159) receives the force sensing signals from the arrangement of displacement signal elements 305 for determining force measurements.

The signal modulating element 350 is attached to the force actuator element 352 which is mechanically coupled to, or part of, the force actuator assembly 382. The force actuator assembly 382 includes a thumb wheel 391, a force actuator body 392, and a parallelogram spring suspension 396, which is the primary difference from the implementations of FIGS. 1 and 2 in which a spring rate spring 196 was utilized. In the configuration of FIG. 3, when a user pushes on the thumb wheel 391 so as to move the slider 130' toward the first end of a scale member of the caliper 100', the force actuator element 352 and attached signal modulating element 350 are pushed forward so as to move relative to the arrangement of displacement signal elements 305. The corresponding position of the signal modulating element 350 is sensed by the arrangement of displacement signal elements 305, as will be described in more detail below with respect to FIG. 6.

With regard to the operation of the parallelogram spring suspension 396, when a user pushes on the thumb wheel 391 so as to move the slider 130' toward the first end of the scale member of the caliper 100', the parallelogram spring suspension 396 flexes forward (e.g., for the measurement of the outside dimensions of a workpiece). When a user moves the thumb wheel 391 in the opposite direction (i.e., so as to reverse the direction of the slider 130' toward the opposite end of the scale member of the caliper 100'), the parallelogram spring suspension 396 flexes backward (e.g., for the measurement of the inside dimensions of a workpiece.) In one implementation, the limits of the motion established by the travel limit pin 398 contacting the internal surfaces 352A and 352B of the force actuator element 352 may function similarly to the limit positions L-extmeas and I-intmeas described above with respect to FIG. 2. In this manner, a bi-directional measurement configuration is achieved through the utilization of the parallelogram spring suspension 396, and without the need of guide bearings or the like.

Similar to the use of the force spring rate spring 196 described above with respect to FIGS. 1 and 2, the use of the parallelogram spring suspension 396 allows a more gradual increase or decrease in force to occur over a greater range of positions. Importantly, this results in more control and a better feel for a user when attempting to exert control to provide a desired amount of force during a measurement process. In addition, use of the parallelogram spring suspension 396 may reduce the number of parts required, and may feel more integrated with the slider 130'.

Figures 4A, 4B:
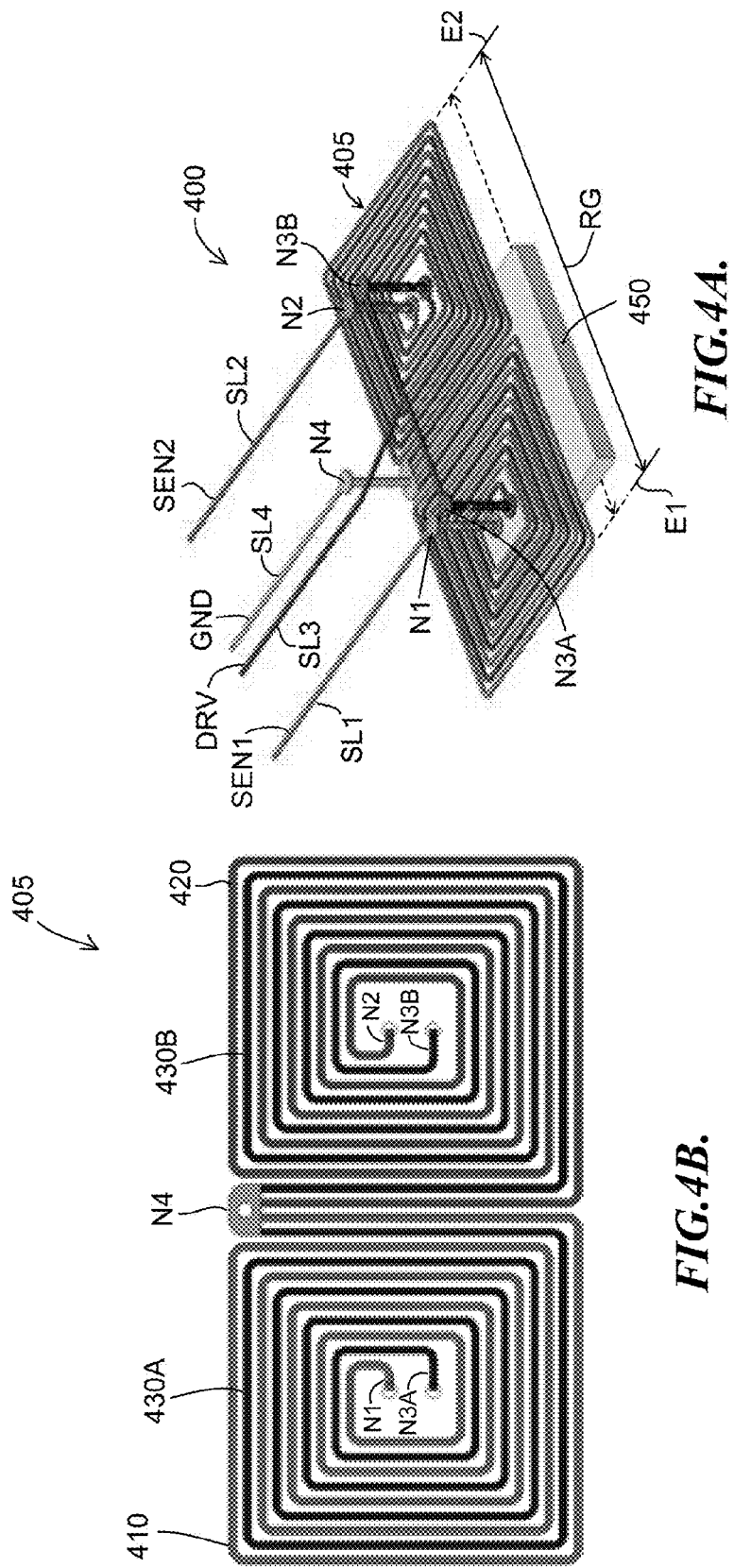
FIGS. 4A and 4B are diagrams illustrating a first embodiment of a force element displacement sensor responsive to a signal modulating element.

FIGS. 4A and 4B are diagrams illustrating a first embodiment of a force element displacement sensor 400 responsive to a signal modulating element. As shown in FIG. 4A, the force element displacement sensor 400 includes an arrangement of displacement signal elements 405 and a signal modulating element 450. As will be described in more detail below, the arrangement of displacement signal elements 405 may in one implementation consist of co-planar inductive coils that are fabricated in a metal layer of a printed circuit board (e.g., the printed circuit board 150 of the slider assembly 170). In one implementation, the printed circuit board may include at least two metal layers. As illustrated in FIG. 4A, a first or top layer may include traces for connecting a series of nodes N1-N4 to force sensing and driving circuitry (e.g., as may be included in the read head signal processing and control circuit 159).

As shown in FIG. 4A, the node N1 is coupled to a signal line SL1 which may provide a sense signal SEN1. The node N2 is coupled to a signal line SL2 which may provide a sense signal SEN2. The nodes N3A and N3B are coupled together and may be referenced as a common node N3 which is coupled to a signal line SL3 which may receive a drive signal DRV. The node N4 is coupled to a signal line SL4 which is coupled to ground GND.

The signal modulating element 450 may consist of a desired material (e.g., a non-ferrous conductor, a ferrite material, etc.) that is movable within a range RG beneath the arrangement of displacement signal elements 405 in order to enhance or disrupt the fields generated proximate to the displacement signal elements 405. The range RG may have a first end E1 and a second end E2. As will be described in more detail below with respect to FIG. 6, when the signal modulating element 450 approaches the first end E1 of the range RG, it may primarily affect the sense signal SEN1, while when the signal modulating element 450 approaches the second end E2 of the range RG, it may primarily affect the sense signal SEN2. As will also be described in more detail below with respect to FIG. 6, the differential between the sense signals SEN1 and SEN2 may be utilized to determine the position of the signal modulating element 450 beneath the next arrangement of displacement signal elements 405. A differential provides for improved linearity and robustness from common-mode errors.

As shown in FIG. 4B, a second or lower metal layer of the printed circuit board may include the arrangement of displacement signal elements 405 (e.g., as printed co-planar inductive coils). The arrangement of displacement signal elements 405 includes a first signal sensing element 410, a second signal sensing element 420, and signal drive elements 430A and 430B (which are referenced together as a signal drive element 430). One end of the first signal sensing element 410 is coupled to the node N1 (i.e., as providing the sense signal SEN1) while the other end is coupled to the node N4 (i.e., as connected to ground GND). One end of the second signal sensing element 420 is coupled to the node N2 (i.e., as providing the sense signal SEN2) while the other end is coupled to the node N4 (i.e., as connected to ground GND). One end of the signal drive element 430A is coupled to the node N3A (i.e., as receiving the drive signal DRV) while the other end is coupled to the node N4 (i.e., as connected to ground GND). One end of the signal drive element 430B is coupled to the node N3B (i.e., as receiving the drive signal DRV) while the other end is coupled to the node N4 (i.e., as connected to ground GND). The operation of the arrangement of displacement signal elements 405 and the signal modulating element 450 will be described in more detail below with respect to FIG. 6.

Figure 5A:
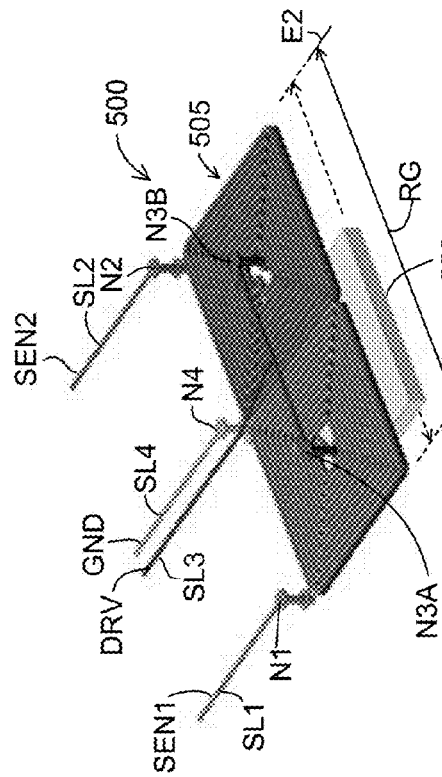
FIGS. 5A-5D are diagrams illustrating a second embodiment of a force element displacement sensor responsive to a signal modulating element.

FIGS. 5A-5D are diagrams illustrating a second embodiment of a force element displacement sensor 500 responsive to a signal modulating element. As shown in FIG. 5A, the force element displacement sensor 500 includes an arrangement of displacement signal elements 505 and a signal modulating element 550. It will be appreciated that certain aspects of the arrangement of displacement signal elements 505 may be similar to that of the arrangement of displacement signal elements 405 of FIGS. 4A and 4B, and may operate similarly except as otherwise described below. For the implementation of FIGS. 5A-5D, the arrangement of displacement signal elements 505 may in one implementation be fabricated in four metal layers of a printed circuit board (e.g., the printed circuit board 150 of the slider assembly 170). As shown in FIG. 5A, a first or top metal layer may include traces for connecting a series of nodes N1-N4 to force sensing and driving circuitry (e.g., as may be included in the read head signal processing and control circuit 159).

As shown in FIG. 5A, in a configuration similar to that of FIG. 4A, the nodes N1, N2, N3 and N4 are coupled to the signal lines SL1, SL2, SL3 and SL4, which are associated with the signals SEN1, SEN2, DRV and GND, respectively. The node N3 is a combined node represented by the nodes N3A and N3B which are coupled together. As indicated in FIG. 5A, the signal modulating element 550 is movable within a range RG beneath the arrangement of displacement signal elements 505. The position of the signal modulating element 550 may be determined according to the differential between the sense signals SEN1 and SEN2, as will be described in more detail below with respect to FIG. 6.

Figure 5D:
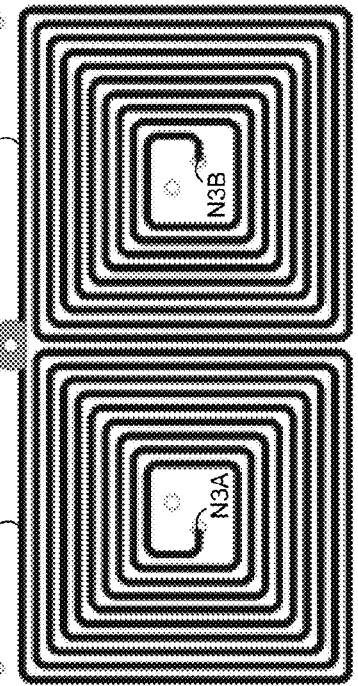
Figure 5B:
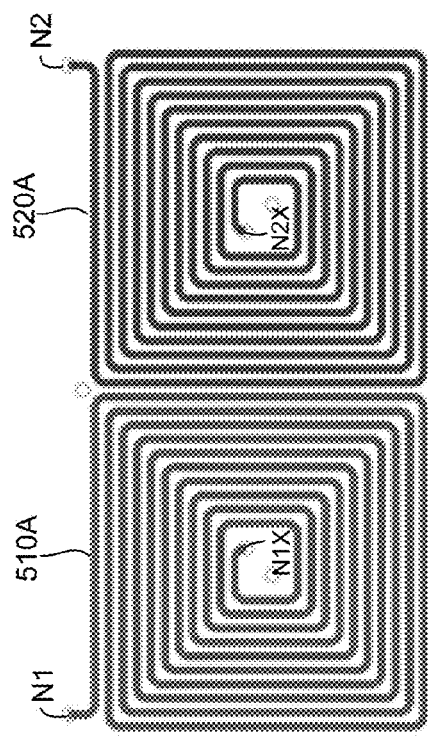
Figure 5C:
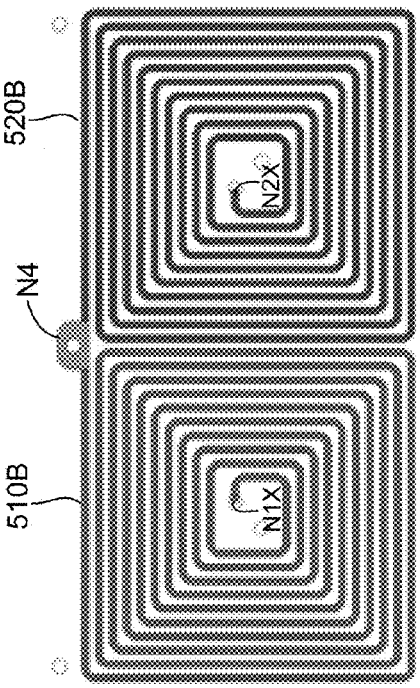

FIGS. 5B, 5C and 5D illustrate components of the arrangement of displacement signal elements 505 that may be fabricated in second, third and fourth metal layers, respectively, of a printed circuit board. As shown in FIGS. 5B and 5C, first signal sensing element portions 510A and 510B may be planar coil portions that are fabricated in the second and third metal layers, respectively, of the printed circuit board. One end of each of the signal sensing element portions 510A and 510B is coupled to a common node N1X which extends through the layers. The other end of the signal sensing element portion 510A is coupled to the node N1 (i.e., for providing the sense signal SEN1), and the other end of the signal sensing element portion 510B is coupled to the node N4 (i.e., as coupled to ground GND).

As also shown in FIGS. 5B and 5C, second signal sensing element portions 520A and 520B may be planar coil portions that are fabricated in the second and third metal layers, respectively, of the printed circuit board. One end of each of the signal sensing element portions 520A and 520B is coupled to a common node N2X which extends through the layers. The other end of the signal sensing element portion 520A is coupled to the node N2 (i.e., for providing the sense signal SEN2), and the other end of the signal sensing element portion 520B is coupled to the node N4 (i.e., as coupled to ground GND).

As shown in FIG. 5D, a pair of signal drive elements 530A and 530B may be planar coils that are fabricated in the fourth metal layer of the printed circuit board. In various implementations, the fourth metal layer of the printed circuit board may be the layer in closest proximity to the signal modulating element 550 during operation. It may also be desirable for the layer in which the signal drive elements 530A and 530B are fabricated to be the thickest metal layer, so as to reduce the resistance and corresponding required power for driving the signal drive elements 530A and 530B. One end of the signal drive element 530A is coupled to the node N3A (i.e., for receiving the drive signal DRV), while the other end is coupled to the node N4 (i.e., as connected to ground GND). Similarly, one end of the signal drive element 530B is coupled to the node N3B (i.e., for receiving the drive signal DRV) while the other end is coupled to the node N4 (i.e., as connected to ground GND). The operation of the arrangement of displacement signal elements 505 and the signal modulating element 550 will be described in more detail below with respect to FIG. 6.

Figure 6:
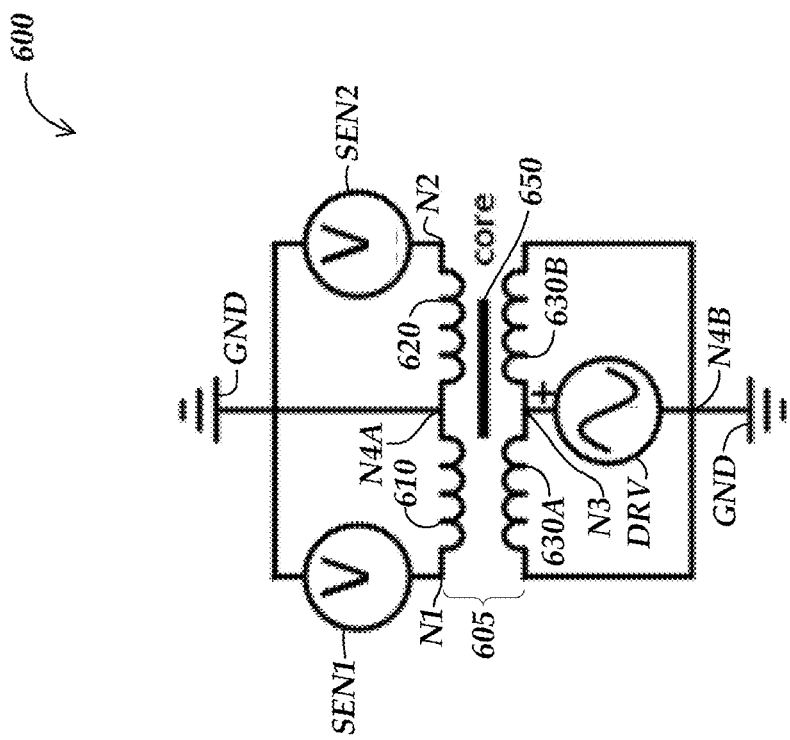
FIG. 6 is a schematic diagram illustrating various operating principles of a force element displacement sensor.

FIG. 6 is a schematic diagram illustrating various operating principles of a force element displacement sensor 600, which may be illustrative of the operating principles of any of the force element displacement sensors 200-500 of FIGS. 1-5D. As shown in FIG. 6, in one implementation the force element displacement sensor 600 may include an arrangement of displacement signal elements 605 and a signal modulating element 650. The arrangement of displacement signal elements 605 may include first and second signal sensing elements 610 and 620 and signal drive elements 630A and 630B. In one specific example implementation, the first and second signal sensing elements 610 and 620 and the signal drive elements 630A and 630B may all consist of planar spiral coils that are printed on a printed circuit board (e.g., the printed circuit board 150 of the slider assembly 170). In various implementations, the signal sensing and signal drive elements may be fabricated in the same or different metal layers of the printed circuit board. For example, in a printed circuit board with two metal layers, the signal sensing and signal drive elements may all be fabricated in the same metal layer (e.g., as illustrated by the configuration of FIGS. 4A and 4B). As another example, in a printed circuit board with four metal layers, the signal sensing and signal drive elements may be fabricated in different metal layers (e.g., as illustrated by the configuration of FIGS. 5A-5D). The signal modulating element 650 may consist of a core (e.g., a non-ferrous conductor such as aluminum or copper, or a ferrite material, etc.). As described above with respect to FIGS. 1 and 2, the signal modulating element 650 may be mechanically displaced along a line parallel to the printed circuit board plane, wherein the amount of displacement correlates to an amount of measurement force being applied by a user for measuring an object.

In one specific example implementation, the signal drive elements 630A and 630B may be driven (e.g., by a drive signal DRV at the node N3) with a selected waveform pattern (e.g., sinusoidal, quasi-sinusoidal with a pulsed resident circuit, etc.) The driving of the signal drive elements 630A and 630B may induce voltage on the first and second signal sensing elements 610 and 620, respectively. In one specific example implementation, eddy currents in the signal modulating element 650 may affect the inductive coupling of the signal drive elements 630A and 630B to the first and second signal sensing elements 610 and 620, respectively, depending on the linear position of the signal modulating element 650. The first and second signal sensing elements 610 and 620 may thus in certain implementations be referenced as variable inductance elements, wherein the inductance depends on the position of the signal modulating element 650.

As a specific illustrative example, if the signal modulating element 650 is at a first end of a range where it is primarily located between the signal drive element 630A and the first signal sensing element 610, it will primarily affect that inductive coupling. Conversely, if the signal modulating element 650 is at a second end of a range where it is primarily located between the signal drive element 630B and the second signal sensing element 620, it will primarily affect that inductive coupling. The effect on the inductive coupling will correspondingly affect the magnitudes of the respective sense signals SEN1 and SEN2. In this manner, the difference between the sense signals SEN1 and SEN2 (i.e., as measured at the nodes N1 and N2), may be indicative of the position of the signal modulating element 650, and thus the amount of measurement force being applied by the user for measuring an object. It will be appreciated that one particular advantage of a configuration utilizing inductive coupling is that the sensor may generally be made to be insensitive to contaminants such as cutting oil, water, other fluids, dust, ferromagnetic particles, etc. In addition, the disclosed configuration may use less power and may be less expensive to produce than other sensor configurations that could be utilized for determining measurement force in the caliper.

In one implementation, the signal drive elements 630A and 630B may consist of two adjacent, co-planar coils that are mirror images of each other and which share a common current source (e.g., from the drive signal DRV at node N3) and a common ground (e.g., at node N4). In such an implementation, the current may flow in opposite directions through the signal drive elements 630A and 630B (i.e., counterclockwise and clockwise, respectively) so that the total inductance is maximized. Fabricating the signal drive elements 630A and 630B to be mirror images of each other also helps ensure that the sense signals SEN1 and SEN2 will be relatively symmetric. The signal drive elements 630A and 630B may also be fabricated in the metal layer of the printed circuit board with the greatest thickness so as to minimize resistance and correspondingly minimize the amount of driving power required. In one implementation, the signal drive elements 630A and 630B may be fabricated in the metal layer that will be closest to the signal modulating element 650 during operation.

In various implementations, the arrangement of displacement signal elements 605 may be fabricated to fit within a footprint as dictated by the available space in the associated section (e.g., a thumb section) of the caliper 100. In one specific example implementation, the dimensions may be relatively small (e.g., 12 mm by 6 mm), which the configurations illustrated in FIGS. 4A, 4B and 5A-5D may be sized to fit.

In various implementations, the width of the signal modulating element 650 may be made to be slightly larger than the width of the arrangement of displacement signal elements 605, so as to accommodate for various misalignments that may occur. In addition, the length of the signal modulating element 650 may be approximately half of the total combined length of the arrangement of displacement signal elements 605, so as to maximize the range and linearity of the response signal (e.g., as determined by the differential between the sense signals SEN1 and SEN2). In a specific example implementation where the total dimensions of the arrangement of displacement signal elements 605 is approximately 12 mm by 6 mm, the signal modulating element 650 may be made to be slightly larger than 6 mm by 6 mm. In addition, the approximate range of motion for the signal modulating element 650 may be made to be from a −3 mm position (i.e., where it is primarily located between the first signal sensing element 610 and the signal drive element 630A) to a +3 mm position (where it is primarily located between the second signal sensing element 620 and the signal drive element 630B).

The signal modulating element 650 may be made of various materials (e.g., non-ferrous conductor, ferrite material, etc.) While a ferrous material may increase the inductive coupling, in certain implementations such a configuration has been experimentally determined to result in a lower total overall effect with regard to the amplitude of the differential of the sense signals SEN1 and SEN2. Thus, in certain implementations it may be desirable to utilize a non-ferrous conductor (e.g., aluminum, copper, etc.), which decreases the inductive coupling, but results in a larger amplitude for the differential of the sense signals SEN1 and SEN2. In one specific example implementation, the core thickness may also be made to be several times the skin depth, depending on the conductivity and the drive frequency.

In various implementations, force element displacement sensor 600 may receive the force drive signal DRV from the same driving circuit (e.g., as part of the read head signal processing and control circuit 159) that provides a slider driving signal for the main slider displacement sensor (e.g., slider displacement sensor 158). In one implementation, the slider drive signal and the force drive signal may be provided during different clock cycles for the driving circuit, so as to avoid any cross-interference between the various signals. In general, it will be appreciated that the disclosed configuration allows a single circuit board (e.g., circuit board 150) to contain all of the required components and associated control circuitry of the arrangement of displacement signal elements 605 and the slider displacement sensor 158.

While the implementation shown in FIG. 6 shows first and second signal sensing elements 610 and 620 which provide separate signals, it should be appreciated that in alternative implementations, the first and second signal sensing elements 610 and 620 may be combined into a single coil with a single output. In another alternative implementation, a single conductive signal sensing element may perform the function of both a drive element and a sense element. A change in complex impedance within this signal sensing element may provide a displacement signal.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrically powered caliper, comprising:
   a scale member including a first measuring surface to be located against a workpiece during a measurement;
   a slider including a second measuring surface to be located against a workpiece during a measurement;
   a slider displacement sensor configured to provide a position signal responsive to changes in a position of the slider along the scale member, the slider displacement sensor comprising a slider conductive signal sensing element fabricated on a circuit board carried on the slider;
   a measurement force sensing arrangement located on the slider, the measurement force sensing arrangement comprising:
      a force actuator that moves relative to the circuit board;
      a force element displacement sensor comprising:
         at least one force element conductive signal sensing element that is fixed relative to the circuit board and that is fabricated in a first metal layer of the circuit board;
         at least one signal modulating element coupled to the force actuator and located proximate to the at least one force element conductive signal sensing element; and
         a force sensing circuit located on the circuit board and coupled to the at least one force element conductive signal sensing element.

2. The caliper of claim 1, wherein the measurement force sensing arrangement is configured to provide a force signal responsive to changes in a measurement force exerted on a workpiece by a user through at least one of the first and second measuring surfaces during a measurement procedure.

3. The caliper of claim 2, wherein the force actuator comprises a rigid element coupled to a force spring rate spring having a dimension that is altered by a user through the force actuator to vary the measurement force.

4. The caliper of claim 3, wherein the at least one signal modulating element is coupled to the force actuator, and is configured to move corresponding to the altered dimension and proximate to the at least one force element conductive signal sensing element.

5. The caliper of claim 1, wherein the force sensing circuit is responsive to a position of the at least one signal modulating element relative to the at least one force element conductive signal sensing element.

6. The caliper of claim 5, wherein the at least one force element conductive signal sensing element comprises a variable inductance element having an inductance that depends on the position of the at least one signal modulating element.

7. The caliper of claim 6, wherein the force element displacement sensor further comprises at least one inductive drive element which is inductively coupled to the at least one variable inductance element, wherein the inductive coupling depends on the position of the at least one signal modulating element.

8. The caliper of claim 7, wherein the at least one signal modulating element comprises at least one of a non-ferrous conductor or a ferrite material.

9. The caliper of claim 7, wherein the at least one variable inductance element comprises at least two planar coils fabricated in the first metal layer or a second metal layer of the circuit board carried on the slider.

10. The caliper of claim 9, wherein the at least two planar coils are symmetric with respect to one another.

11. The caliper of claim 10, wherein the at least one signal modulating element covers approximately half of each of the at least two planar coils when in a rest position.

12. The caliper of claim 7, wherein the at least one variable inductance element comprises a planar signal coil and the at least one inductive drive element comprises a planar drive coil that is fabricated in the first metal layer or a second metal layer of the circuit board carried on the slider.

13. The caliper of claim 12, wherein:
   the planar signal coil and the planar drive coil are configured to surround a shared area;
   the circuit board comprises two layers; and
   the planar signal coil and the planar drive coil are fabricated in the same metal layer of the circuit board.

14. The caliper of claim 12, wherein:
   the planar signal coil and the planar drive coil are configured to surround a shared area;
   the circuit board comprises four layers; and
   the planar signal coil and the planar drive coil are fabricated in different metal layers of the circuit board.

15. The caliper of claim 1, wherein:
   the circuit board carried on the slider abuts the slider at a mounting region of the circuit board;
   the slider conductive signal sensing element of the slider displacement sensor overlaps the scale member in a scale region located in a first lateral direction away from the mounting region; and
   the at least one force element conductive signal sensing element of the force element displacement sensor is arranged in a region located in the opposite lateral direction away from the mounting region.

16. An electrically powered caliper, comprising:
a scale member including a first measuring surface to be located against a workpiece during a measurement;
a slider including a second measuring surface to be located against a workpiece during a measurement;
a slider displacement sensor configured to provide a position signal responsive to changes in a position of the slider along the scale member, the slider displacement sensor comprising at least one displacement sensor component that is fabricated in a first metal layer on a printed circuit board that is carried on the slider; and
a measurement force sensing arrangement located on the slider and configured to provide a force signal responsive to changes in a measurement force exerted on a workpiece by a user through at least one of the first and second measuring surfaces during a measurement procedure, the measurement force sensing arrangement including a force element displacement sensor comprising at least one displacement sensor component that is fabricated in the first metal layer or a second metal layer on the printed circuit board that is carried on the slider.

17. The caliper of claim 16, wherein the measurement force sensing arrangement comprises:
a force actuator comprising a rigid element coupled to a force spring rate spring having a dimension that is altered by a user through the force actuator to vary the measurement force; and
at least one signal modulating element that is coupled to the force actuator, and that is configured to move corresponding to the altered dimension and proximate to the at least one displacement sensor component of the force element displacement sensor that is fabricated in the first metal layer or the second metal layer on the printed circuit board.

18. The caliper of claim 16, wherein:
the circuit board carried on the slider abuts the slider at a mounting region of the circuit board;
the at least one displacement sensor component of the slider displacement sensor that is fabricated in the first metal layer on the printed circuit board overlaps the scale member in a scale region located in a first lateral direction away from the mounting region; and
the at least one displacement sensor component of the force element displacement sensor that is fabricated in the first metal layer or the second metal layer on the printed circuit board is arranged in a region located in the opposite lateral direction away from the mounting region.

19. The caliper of claim 16, wherein the measurement force sensing arrangement includes a force sensing circuit located on the circuit board and coupled to the at least one displacement sensor component of the force element displacement sensor that is fabricated in the first metal layer or the second metal layer on the printed circuit board.

* * * * *